United States Patent
Lee et al.

(10) Patent No.: US 7,340,639 B1
(45) Date of Patent: Mar. 4, 2008

(54) SYSTEM AND METHOD FOR PROXYING DATA ACCESS COMMANDS IN A CLUSTERED STORAGE SYSTEM

(75) Inventors: Herman Lee, Mountain View, CA (US); Vijayan Rajan, Sunnyvale, CA (US)

(73) Assignee: Network Appliance, Inc., Sunnyvale, CA (US)

(*) Notice: Subject to any disclaimer, the term of this patent is extended or adjusted under 35 U.S.C. 154(b) by 398 days.

(21) Appl. No.: 10/811,095

(22) Filed: Mar. 26, 2004

Related U.S. Application Data

(60) Provisional application No. 60/534,909, filed on Jan. 8, 2004.

(51) Int. Cl.
*G06F 13/14* (2006.01)

(52) U.S. Cl. .......................... 714/6; 711/148; 711/149; 714/5

(58) Field of Classification Search ............... None
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,625,749 B1 | 9/2003 | Quach | |
| 6,728,897 B1 | 4/2004 | Cramer et al. | |
| 6,760,304 B2 | 7/2004 | Uzrad-Nali et al. | |
| 6,775,702 B2 | 8/2004 | Oeda et al. | |
| 6,868,438 B2* | 3/2005 | Fujimoto ............... 709/213 |
| 6,915,389 B2* | 7/2005 | Fujimoto ............... 711/148 |
| 7,003,634 B2* | 2/2006 | Takeda et al. ........ 711/148 |
| 2002/0078371 A1* | 6/2002 | Heilig et al. ........ 713/200 |
| 2003/0110172 A1* | 6/2003 | Selman et al. ....... 707/10 |
| 2003/0115350 A1 | 6/2003 | Uzrad-Nali et al. | |
| 2004/0064815 A1 | 4/2004 | Uzrad-Nali et al. | |
| 2004/0078467 A1* | 4/2004 | Grosner et al. ...... 709/226 |
| 2004/0156393 A1 | 8/2004 | Gupta et al. | |
| 2004/0210795 A1* | 10/2004 | Anderson ............. 714/6 |

(Continued)

OTHER PUBLICATIONS

Maintenance Procedures ND (8C) nd-network disk control Feb. 1985.

(Continued)

*Primary Examiner*—B. James Peikari
(74) *Attorney, Agent, or Firm*—Cesari and McKenna LLP

(57) ABSTRACT

A system and method proxies data access commands across a cluster interconnect between storage appliances in a cluster. Each storage appliance activates two ports for data access, a local port for data access requests directed to clients of the storage appliance and a proxy port for data access requests directed to the partner storage appliance. Clients utilizing multi-pathing software may send data access requests to either the local port of the storage appliance or the proxy port of the storage appliance. The system and method improve high availability especially during a loss of connectivity due to non-storage appliance hardware failure.

39 Claims, 8 Drawing Sheets

U.S. PATENT DOCUMENTS

2004/0268017 A1    12/2004    Uzrad-Nali et al.

OTHER PUBLICATIONS

Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.

Anthony J. McGregor Department of Computer Science, University of Waikato Dissertation: Block-Based Distributed File Systems Jul. 1997.

Anupam Bhide, Elkootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

| | |
|---|---|
| LOCAL HANDLE | 505 |
| PARTNER HANDLE | 510 |
| STATE | 515 |
| PORT NAME | 520 |
| NODE NAME | 525 |
| LUN | 530 |
| COMMAND DATA BLOCK | 535 |
| TRANSFER LENGTH | 540 |
| ⋮ | 545 |

SYSTEM AND METHOD FOR PROXYING DATA ACCESS COMMANDS IN A CLUSTERED STORAGE SYSTEM

CROSS-REFERENCE TO RELATED APPLICATIONS

The present application claims priority to U.S. Provisional Patent Application Ser. No. 60/534,909, which was filed on Jan. 8, 2004, by Herman Lee, et al for a SYSTEM AND METHOD FOR PROXYING DATA ACCESS COMMANDS IN A CLUSTERED STORAGE SYSTEM, which is hereby incorporated by reference.

FIELD OF THE INVENTION

The present invention relates to clustered storage systems and, in particular, to proxying data access commands in a clustered storage system.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising of a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a multi-protocol storage appliance suitable for use in the SAN, is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al.

It is advantageous for the services and data provided by a storage system, such as a storage appliance to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al. An administrator may desire to take a storage appliance offline for a variety of reasons including, for example, to upgrade hardware, etc. In such situations, it may be advantageous to perform a user-initiated takeover operation, as opposed to a failover operation. After the takeover operation is complete, the storage appliance's data will be serviced by its partner until a giveback operation is performed.

In certain known storage appliance cluster configurations, the transport medium used for communication between clients and the cluster is Fibre Channel (FC) cabling utilizing the FCP protocol (SCSI embedded in FC) for transporting data. In SCSI terminology, clients 104 operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g. World Wide Node Name (WWNN) and World Wide Port Name (WWPN). A Device Identifier unique within a given FC switching fabric and is assigned dynamically to the FC port by the FC switch 106, 108 coupled thereto.

In conventional failover techniques involving clusters of storage appliances, each storage appliance in the cluster maintains two physical FC ports, namely an A port and a B port. The A port is utilized for processing and handling data access requests directed to the storage appliance. The B port typically is in a standby mode; when a failover situation occurs, the B port is activated and "assumes the identity" of its failed partner storage appliance. At that point, the B port functions as a FC target to receive and handle data access requests directed to the failed storage appliance. In this way, the surviving storage appliance may process requests directed to both the storage appliance and its failed partner storage appliance. Such a conventional FC failover is further described in the above-referenced patent application entitled SYSTEM AND METHOD FOR TRANSPORT-LEVEL FAILOVER OF FCP DEVICES IN A CLUSTER.

Typically, a port of a "surviving" storage appliance assumes the identity of its is failed partner storage appliance by servicing data access requests direct to a WWNN and a WWPN of the partner. For many client operating systems, this is sufficient to permit clients to transparently access the surviving storage appliance as if it were the failed storage appliance. After the surviving storage appliance assumes the identity of the failed storage appliance, data access requests directed to the network address of the failed storage appliance are received and processed by the surviving storage appliance. Although it may appear to the clients as if the failed storage appliance was momentarily disconnected and reconnected to the network, data operations or data access requests continue to be processed.

However, other client operating systems, including, for example the well known HP/UX and AIX operating systems, utilize the FC device ID (DID) in addition to the WWPN and WWNN to identify a FC target. Clients utilizing such operating systems are thus unable to access a surviving storage appliance that assumes the identity of its failed partner, as described above. Additionally, these operating systems require that all network "paths" to the target including the WWNN, WWPN and DID, are known during the original configuration of the client. This is typically accomplished by the client performing an input/output (I/O) scan of all connected devices targets during system initialization. Accordingly, where clients utilize operating systems that require the use of a DID or that require prior knowledge of all available paths to a target, conventional failover techniques do not ensure continued connectivity.

Another noted problem with certain storage appliance cluster configurations occurs when a network path from a client to a storage appliance of a cluster fails. In such a situation, the storage appliance remains operational, but has lost network connectivity with the client. This may occur as a result of, for example, a failure of a switch in the network, improper cabling or failure of the physical transport medium. Often, the client may retain a network path to the other storage appliance in the cluster by, for example, a redundant data path via a second switch, etc. However, since both storage appliances are functioning correctly, the cluster will typically not perform a failover operation. Yet, clients are unable to access data stored within the storage appliance cluster because of the loss of connectivity.

SUMMARY OF THE INVENTION

The present invention overcomes the disadvantages of the prior art by providing a system and method for proxying data access commands between storage systems organized in a cluster. As used herein, a storage system cluster comprises a plurality of storage systems, embodied as storage appliances, that are interconnected by a cluster interconnect device. Each storage appliance is further coupled to a plurality of disks. According to the invention, one or more of the storage appliances in the cluster activates a selected port for use for proxying data access commands. This selected port (a "proxy port") may be either a physical Fibre Channel (FC) port or a virtual port associated with the physical port. The proxy port is configured by clients of the storage system cluster as an alternative network path to the disks of the cluster.

Upon receiving a command at its proxy port, a "local" storage appliance forwards the command over the cluster interconnect to its "partner" storage appliance. The partner storage appliance processes the command by, among other things, accessing the disks. Data associated with the command is then sent to the local storage appliance via the cluster interconnect and thereafter returned to the client. Thus, the local storage appliance serves as a proxy for the partner storage appliance. If a client is using multi-path software, two alternative paths to disks connected to the partner storage appliance are available to the client. The first path is directed to the partner storage appliance and the second is via the proxy port on the local storage appliance. Therefore, if connectivity is lost to the partner storage appliance, a client may continue to access data serviced by the partner storage appliance by directing data access requests to the proxy port of the local storage appliance.

BRIEF DESCRIPTION OF THE DRAWINGS

The above and further advantages of invention may be understood by referring to the following description in conjunction with the accompanying drawings in which like reference numerals indicate identical or functionally similar elements:

FIG. 5 is a schematic block diagram of an exemplary cluster interconnect data structure in accordance with an embodiment of the present invention;

DETAILED DESCRIPTION OF ILLUSTRATIVE EMBODIMENTS

A. Clustered Storage System Environment

Figure 1:
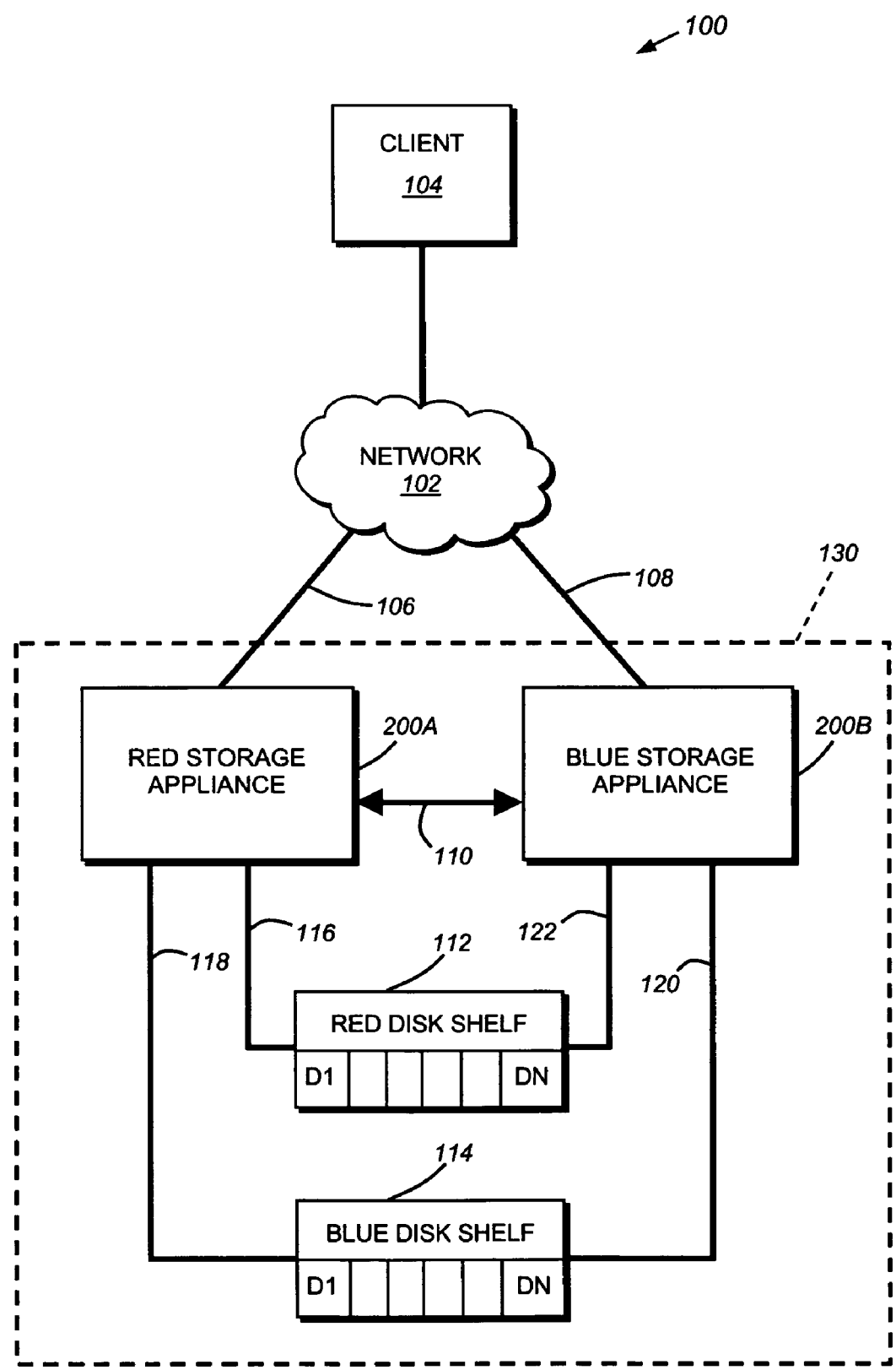
FIG. 1 is a schematic block diagram of a storage system cluster environment in accordance with an embodiment of the present invention.

FIG. 1 is a schematic block diagram of an exemplary network environment 100 in which the principles of the present invention are implemented. The environment 100 is comprises a network cloud 102 coupled to a client 104. The client 104 may be a general-purpose computer, such as a PC or a workstation, or a special-purpose computer, such as an application server, configured to execute applications over an operating system that includes block access protocols. A storage system cluster 130 comprising Red Storage System 200A and Blue Storage System 200B are also connected to the cloud 102. These storage systems, described further below, are illustratively embodied as storage appliances configured to control storage of and access to interconnected storage devices, such as disks residing on disk shelves 112 and 114.

In the illustrated example, Red Storage System 200A is connected to Red Disk Shelf 112 by a data access loop 116. It should be noted that such a data access loop can be any acceptable networking media including, for example, a Fibre Channel Arbitrated Loop (FC-AL). The Red Storage System 200A also accesses Blue Disk Shelf 114 via counterpart data access loop 118. Likewise, Blue Storage System 200B accesses Blue Disk Shelf 114 via data access loop 120 and Red Disk Shelf 112 through counterpart data access loop 122. Thus each disk shelf in the cluster is accessible to each storage appliance, thereby providing redundant data paths in the event of a failover. It should be noted that the Red and Blue disk shelves are shown directly connected to the storage systems 200 for illustrative purposes only. The disk shelves and storage systems may be operatively interconnected in any suitable FC switching network topology. Alternately, the disks may be connected to the storage systems using any computer-disk interconnection technique.

During normal cluster operation, the storage system that is connected to a disk shelf via the disk shelf's primary loop is the "owner" of the disk shelf and is primarily responsible for servicing data requests directed to blocks on volumes contained on that disk shelf. Thus, in this example, the Red storage system 200A owns the Red Disk Shelf 112 and is primarily responsible for servicing data access requests for blocks contained on that disk shelf. Similarly, the Blue storage system 200B is primarily responsible for the Blue disk shelf 114. When operating as storage system cluster 130, each storage system 200 is typically configured to take over and assume data handling capabilities for the other disk shelf in the cluster 130.

Connecting the Red and Blue Storage Systems 200A, B is a cluster interconnect 110, which provides a direct communication link between the two storage systems. The cluster interconnect 110 can be of any suitable communication medium, including, for example, an Ethernet connection or a FC data link.

Communication links 106 and 108 may comprise a plurality of differing connections including, for example, a single network link connection or multiple network "paths" between the network cloud 102 and the storage systems 200. For example, a single network link may be connected to a single physical port on a "local" storage system, which may further utilize a virtual port for servicing data access requests directed to itself and its "partner" storage system. Similarly, the storage system 200 may include a plurality of physical ports, each of which is connected to a separate physical network link 106 or 108. As would be appreciated by one skilled in the art, a plurality of configurations are possible to meet various configuration objectives of the storage system cluster 130.

B. Storage Appliance

Figure 2:
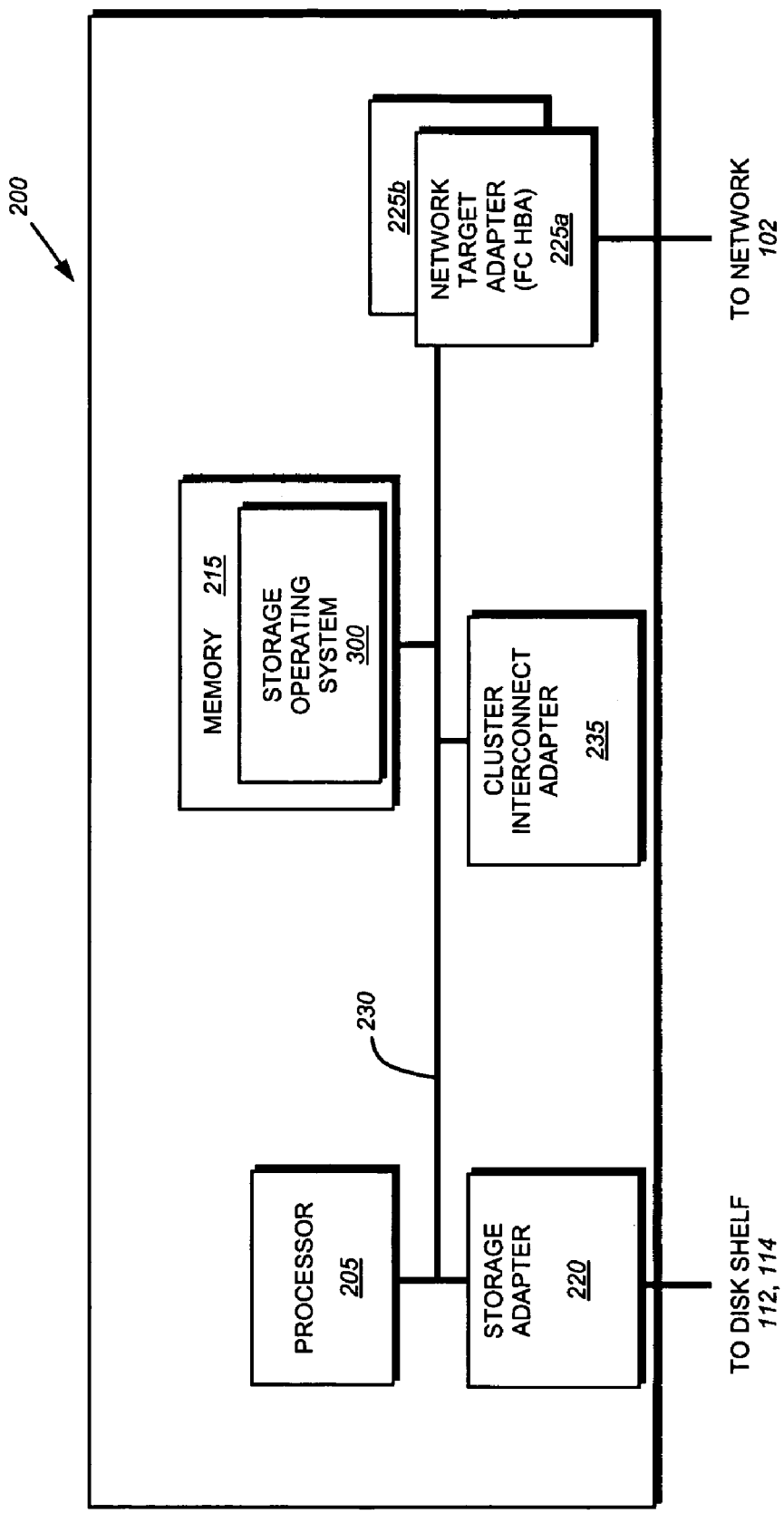
FIG. 2 is a schematic block diagram of an exemplary storage appliance in accordance with an embodiment of the present invention.

FIG. 2 is a schematic block diagram of an exemplary storage system 200 used in cluster 130 and configured to provide storage service relating to the organization of information on storage devices, such as disks. The storage system 200 is illustratively embodied as a storage appliance comprising a processor 205, a memory 215, a plurality of network adapters 225a, 225b, a storage adapter 220 and a cluster interconnect adapter 235 interconnected by a system bus 230. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. An example of such a storage appliance is further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. Note that the terms "storage system" and "storage appliance" are used interchangeably. The storage appliance 200 also includes a storage operating system 300 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the multi-protocol storage appliance 200 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. patent application Ser. No. 10/216,453, now issued as U.S. Pat. No. 7,107,385, entitled STORAGE VIRTUALIZATION BY LAYERING VIRTUAL DISK OBJECTS ON A FILE SYSTEM, by Vijayan Rajan, et al. The multi-protocol storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 225 a, b also couple the storage appliance 200 to a plurality of clients 104 that may be further configured to access the stored information as blocks or disks. The network adapters 225 may comprise a FC host bus adapter (HBA) having the mechanical, electrical and signaling circuitry needed to connect the storage appliance 200 to the network 102. In addition to providing FC access, the FC HBA may offload FC network processing operations from the storage appliance's processor 205. The FC HBAs 225 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network cloud 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the is vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

A cluster interconnect adapter 235 of the storage appliance 200 is coupled to the cluster interconnect 110 to provide a connection to a cluster partner. Illustratively, the cluster interconnect adapter 235 is a FC HBA. The storage appliance utilizes the cluster interconnect for a variety of purposes including, for example, exchanging status information and heartbeat signals with its cluster partner. In accordance with the illustrative embodiment of the present invention, the cluster interconnect also provides a data pathway for proxying data access commands.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 3:
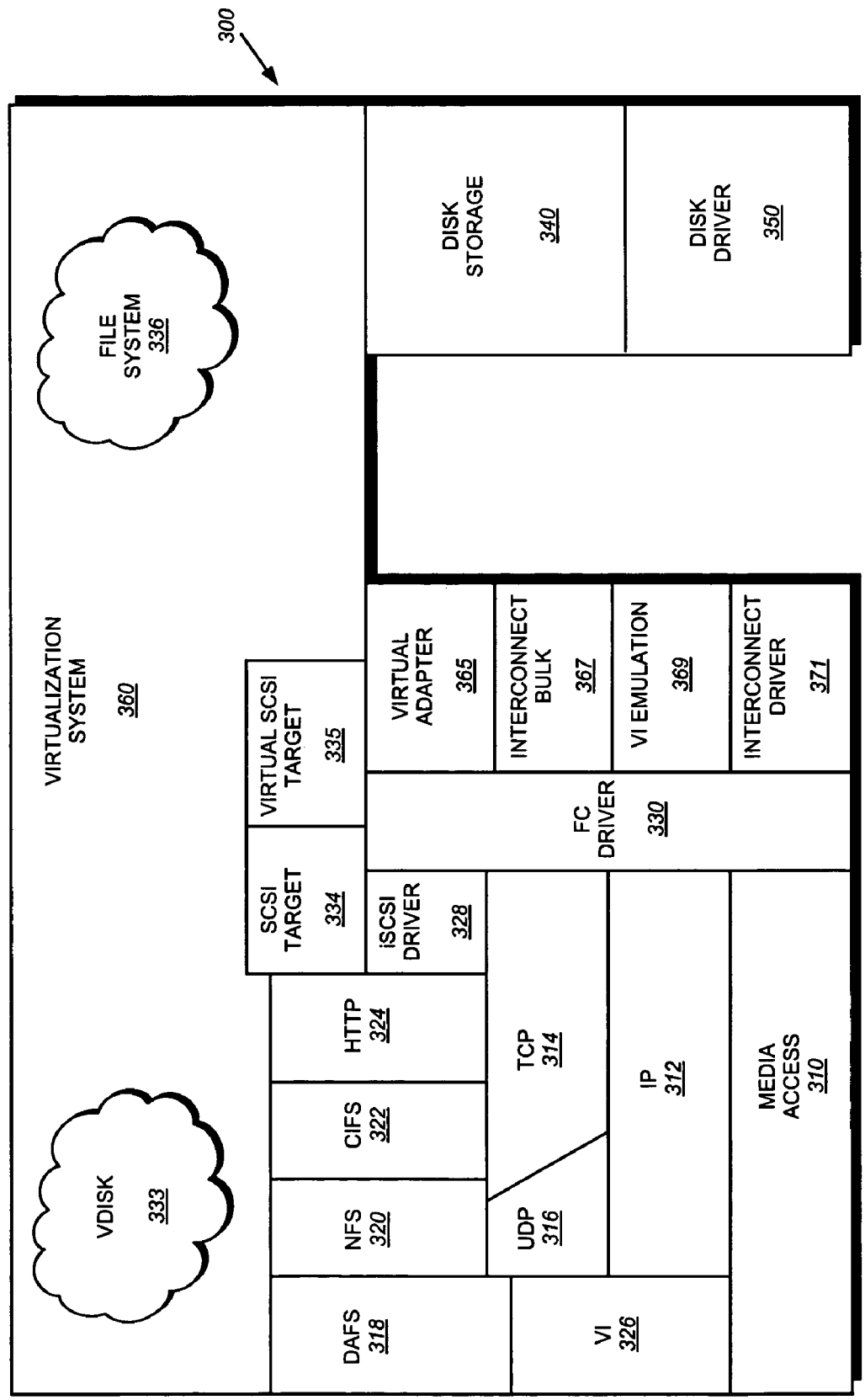
FIG. 3 is a schematic block diagram of an exemplary storage operating system for use with the exemplary storage appliance of FIG. 2 in accordance with an exemplary embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333, SCSI target module 334 and virtual SCSI target module 335. These modules may be implemented as software, hardware, firmware or a combination thereof. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

The storage operating system 300 also includes a virtual SCSI target module 335 that performs similar functions to the SCSI target module 334 but via a virtual adapter 365. In other words, the SCSI target module 334 acts as a SCSI target layer for requests coming from the physical HBA and FC driver, whereas the virtual SCSI target module 335 acts as a SCSI target layer for requests to and from the virtual adapter 365 and cluster interconnect 110. The virtual SCSI target module 335 is disposed over an interconnect communication stack that comprises the virtual adapter 365, an interconnect bulk 367, a VI emulation layer 369 and an interconnect driver layer 371. The virtual adapter 365 provides a software interface between the virtual SCSI target module 335 and the lower levels of the interconnect protocol stack, i.e., the virtual adapter 365 functions as an adapter driver to the interconnect protocol stack. The interconnect bulk module 367 provides flow control over the cluster interconnect 110 for proxying services. VI emulation layer 369 implements the appropriate RDMA functionality of a VI protocol over the interconnect driver 371, which directly interfaces with the cluster interconnect adapter 235 to provide data access transmissions over the cluster interconnect 110.

In accordance with the illustrative embodiment, the FC driver 330 directs received FCP commands to either the SCSI target module 334 or the virtual SCSI target module 335 depending upon the port at which the command is received. If the command is received at a port utilized by the storage appliance for accepting data requests directed to vdisks or files serviced by that storage appliance ("a local port"), the FC driver forwards the command to the SCSI target module. If the command is received at a port utilized by the storage appliance for receiving requests to be proxied to a partner storage appliance ("a proxy port"), the FC driver 330 passes the command to the virtual SCSI target module for processing. Thus, the FC driver 330 makes this forwarding decision based upon the port from which the command is received. It should be noted that in alternate embodiments, the forwarding decision may be based upon other factors, including, for example, a lun value within the received command or the network address of the initiator.

D. Data Access Proxying

As noted, each device attached to a FC network has a unique World Wide Node Name (WWNN) that illustratively is a 64-bit value. Each FC device also has one or more associated ports each of which has a unique World Wide Port Name (WWPN) that is illustratively a 64-bit value. Each device is, thus, uniquely identified by a WWNN and one or more WWPNs.

In the illustrative embodiment, each storage appliance in the storage system cluster 130 includes a plurality of data access ports, e.g., two FC ports, on FC HBA 225. Each HBA may alternatively have a single FC port or multiple virtual ports on a single physical port. It should be noted that while this description is written in reference to FB and HBAS, the teachings of the present invention are applicable to any suitable networking medium including, for example, TCP/IP over Ethernet (iSCSI). A first port (a "local port"), whether physical or virtual, is utilized by the storage appliance for accepting data access requests directed to vdisks or files serviced by the storage appliance. A second port (a "standby port") may be utilized during takeover in the event of a failure of a "partner" storage appliance. Such a failover procedure utilizing virtual ports is described in U.S. patent application Ser. No. 10/672,260, entitled SYSTEM AND METHOD FOR FAILOVER USING VIRTUAL PORTS IN CLUSTERED SYSTEMS, by Fang Wang, et al. A third port (a "partner port" or "proxy port") may be utilized for proxying data access to the partner storage appliance in accordance with the teachings of the present invention. It should be noted that any number of ports may be utilized, for example, a storage appliance may have only a local port for accepting data access requests directed to it and a proxy port for proxying data access commands; notably, the storage appliance does not have a standby port for a failover situation. As will be appreciated by those skilled in the art, multiple configurations are possible including, for example, the use of virtual and physical ports in mixed configurations. For example, the local port may be a physical port while the standby and proxy ports may utilize virtual ports associated with the same physical port.

The present invention permits clients of the storage appliances cluster to utilize redundant data paths to disks connected to a storage appliance in the cluster. The first data path to disks is via a direct connection to a storage appliance in the cluster and the second path is via a proxy port on the local storage appliance. If connectivity is lost to the partner storage appliance, a client may continue to access data serviced by the partner storage appliance by directing data access requests to the proxy port of the local storage appliance in the cluster.

Figure 4:
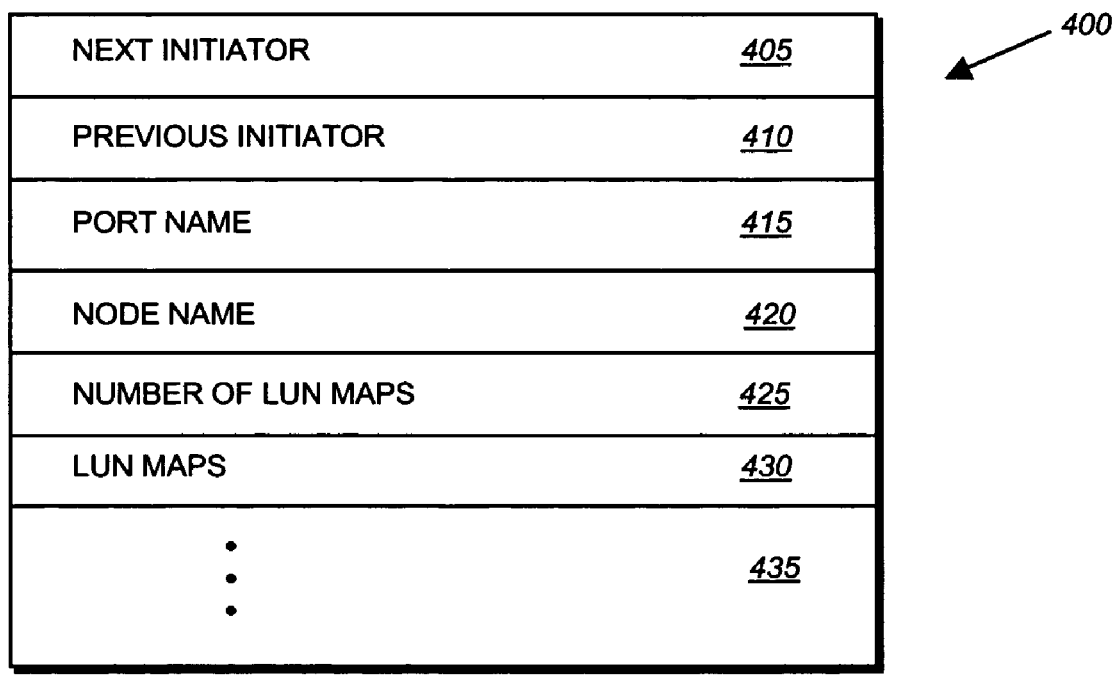
FIG. 4 is a schematic block diagram of an exemplary initiator data structure in accordance with an embodiment of the present invention.

Each storage appliance in the storage appliance cluster maintains a set of initiator data structures 400 that are utilized by the storage appliance to store various data relating to initiators connected thereto. FIG. 4 is a schematic block diagram of an exemplary initiator data structure utilized by storage appliances in a cluster configuration. The initiator data structure includes a next initiator field 405, a previous initiator field 410, a port name field 415, a node name field 420, a number of lun maps field 425, a lun maps field 430 and, in alternate embodiments, additional fields 435. The next initiator and previous initiator fields 405, 410 are utilized to maintain a linked list of initiators associated with the storage appliance. The port name field 415 contains the WWPN of the initiator. Similarly, the node name field 420 contains the WWNN of the initiator. The number of lun maps field 425 identifies the number of lun maps 430 associated with the initiator. Each lun map 430 identifies which luns (vdisks) a particular initiator may access. Lun maps are further described in U.S. patent application Ser. No. 10/619,122, entitled OPTIMIZED LUN MASKING, by Herman Lee, et al.

FIG. 5 is a schematic block diagram of an interconnect data structure 500. In the illustrative embodiment, the interconnect data structure 500 is created and forwarded from the local storage appliance over the cluster interconnect 110 to the partner storage appliance in response to the local storage appliance receiving a command that is to be proxied to the partner. The interconnect data structure 500 includes a local handle field 505, partner handle field 510, state field 515, port name field 520, node name field 525, lun field 530, command data block field 535, transfer length field 540 and, in alternate embodiments, additional fields 545. The local and partner handle fields 505, 510 contain local and partner handles that identify command block data structures 600 on the local and partner storage appliances used to track a command encapsulated in the interconnect data structure. The content of the port name field 520 identifies the WWPN associated with the proxy port that is receiving the command included in the interconnect data structure. Similarly, the content of the node name field 525 includes the WWNN of the proxy port. The lun field 530 identifies the lun to which the received command is directed. The command data block 535 contains a received SCSI command data block (CDB) that is forwarded to the partner storage appliance from the local storage appliance. The transfer length field 540 is utilized for tracking the total amount of data transferred in response to a specific command.

Figure 6:
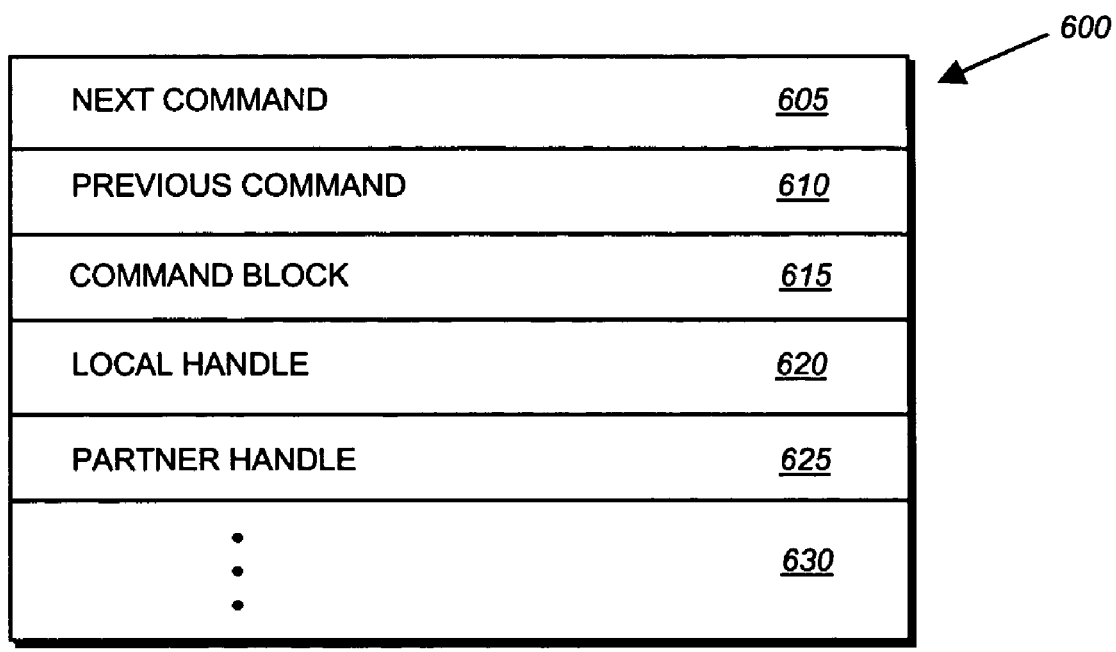
FIG. 6 is a schematic block diagram of an exemplary command data block in accordance with an embodiment of the present invention.

FIG. 6 is a schematic diagram of an exemplary command block data structure (CBD) 600. The local and partner storage appliances utilize command block data structures (CBD) 600 to maintain queues of outstanding commands to be processed. The CBD structure 600 includes a next command field 605, previous command field 610, a command block field 615, local handle field 620, a partner handle field 625 and, in alternate embodiments, additional fields 630. The next and previous command fields 605, 610 contain pointers to additional CBD structures 600 within a queue associated with a given local and/or partner storage appliance. The command block field 615 contains a pointer to a conventional SCSI CBD associated with this command. The local and partner handle fields 620, 625 contain local and partner handles utilized to tag appropriate commands. The local storage appliance tags its requests with the local handle 620 using a specific and storage appliance-unique identifier. Replies from the partner storage appliance contain the appropriate local handle 620 for the local storage appliance to determine an associated target command. Similarly, the partner storage appliance tags its requests with the partner handle 625. Any reply from the local storage appliance contains a partner handle 625 for the partner storage appliance to determine the appropriate target command for a response.

Figure 7:
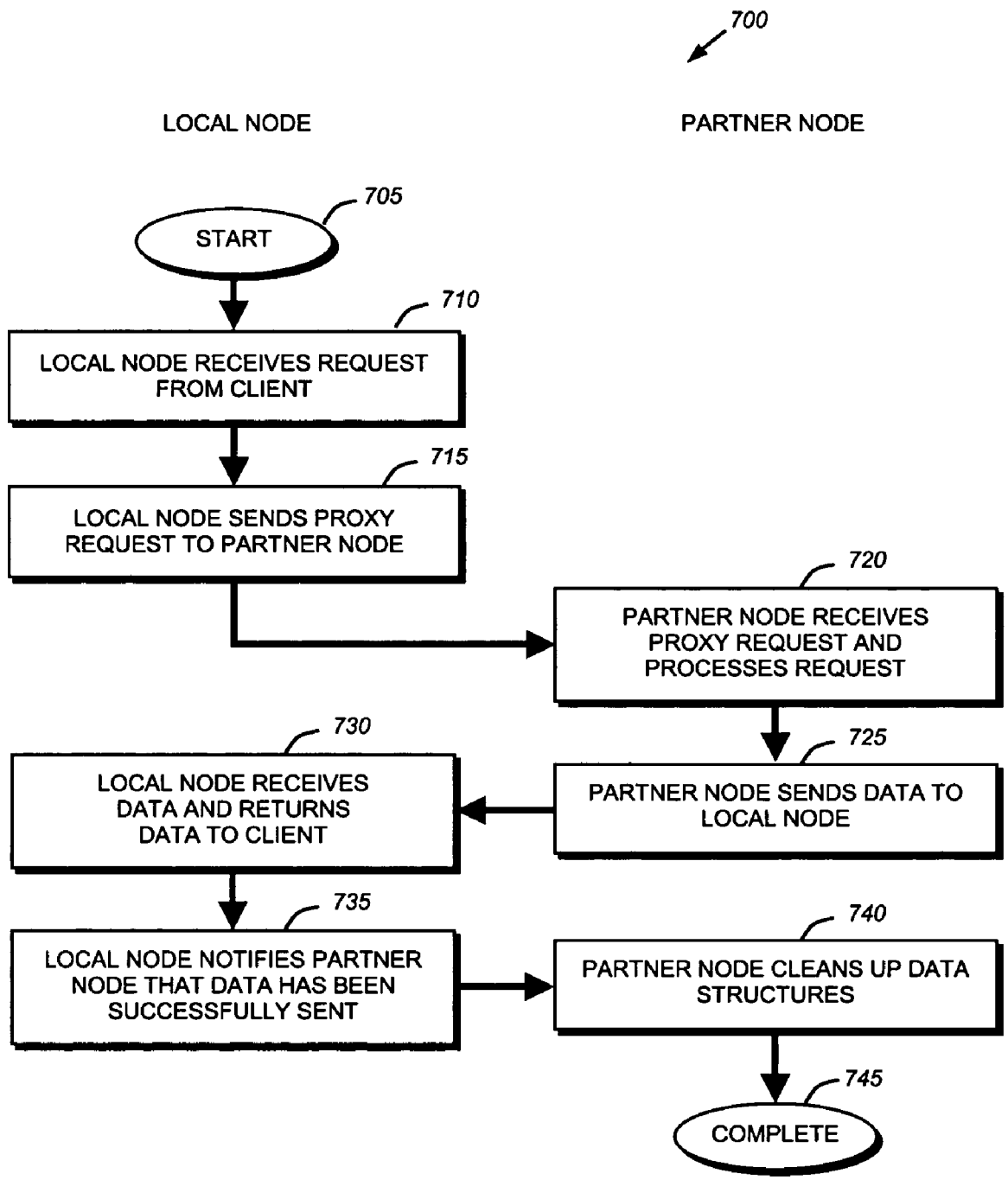
FIG. 7 is a flowchart detailing the steps of a procedure for proxying data access commands in a clustered storage system in accordance with an embodiment of the present invention.

FIG. 7 is a flow chart illustrating the steps of a procedure 700 performed by the local storage appliance and partner storage appliance when processing data access requests in accordance with an embodiment of the present invention. The procedure begins in step 705 and proceeds to step 710 where the local storage appliance ("local node") receives a proxy request from a client via its proxy port. As described further below, the received request is processed by the storage operating system and sent to the virtual SCSI target module of the storage operating system. The virtual SCSI target module then forwards the request over the cluster interconnect to the partner storage appliance ("partner node") in step 715 by, for example, embedding the SCSI CDB in a CBD structure 600.

The partner node receives and processes the proxy data access request in step 720. If the proxy data access request is a write operation, the data is written to the appropriate disks. Alternately, if the proxy request is a read command, the appropriate disk blocks are retrieved from disk. Next, in step 725, the partner node sends data responsive to the proxy request to the local node. In the case of a write operation, the responsive data may comprise an acknowledgement that the requested data has been written or an error condition. In the case of a read operation, the responsive data may comprise the requested read data or an error condition.

The local node receives the responsive data from the partner node and returns that data to the initiating client in step 730. This is accomplished by, for example, creating an appropriate SCSI, FCP or iSCSI response from the responsive data and forwarding it to the initiator. Once the data has been returned to the client, the local node then notifies the partner node that the data has been successfully returned in step (735) by sending a confirmation message over the cluster interconnect to the partner node. In response to receiving the acknowledgement, the partner node "cleans up" appropriate data structures that were generated in processing the data access request (step 740). The procedure then ends in step 745.

Figure 8:
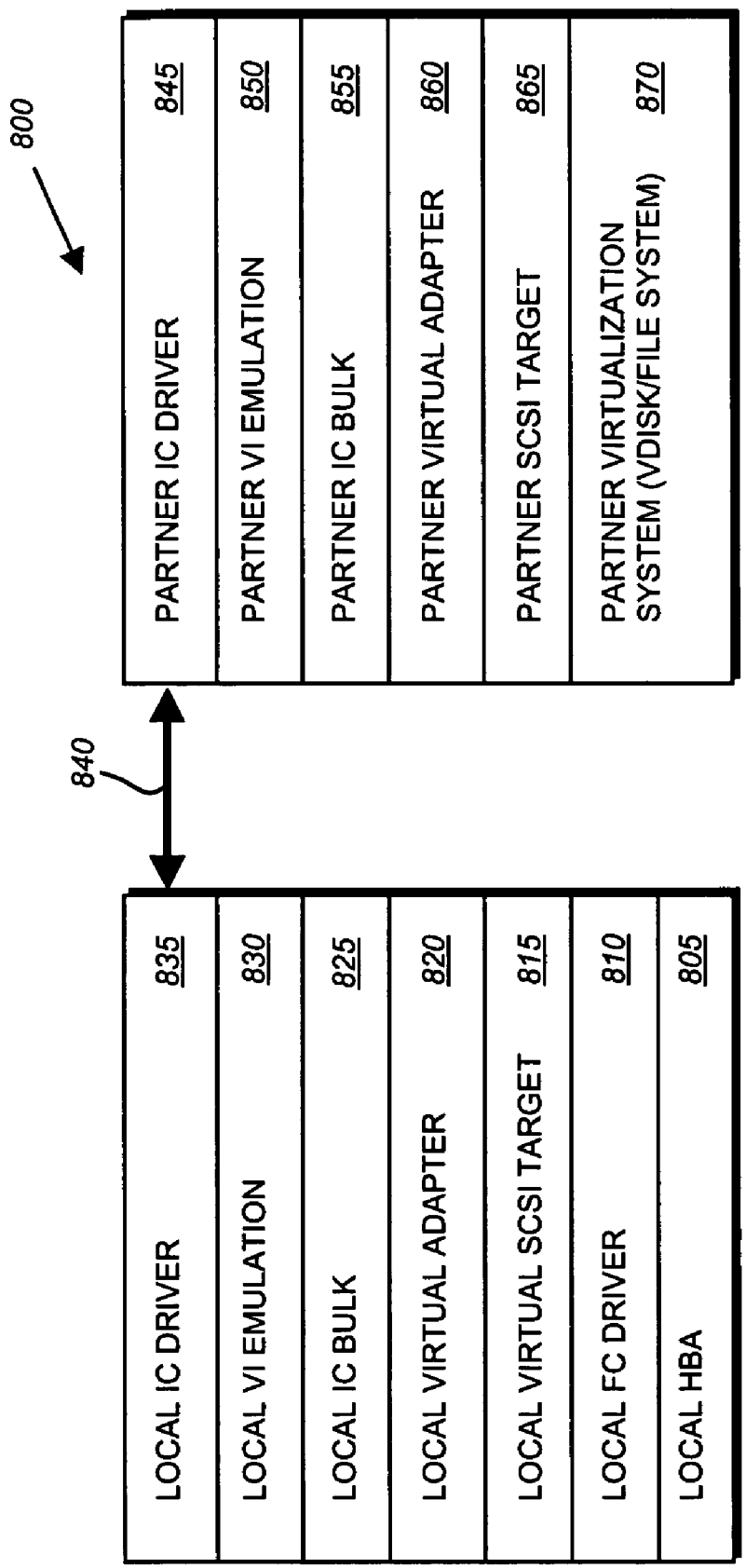
FIG. 8 is an exemplary data flow diagram showing software and hardware layers in accordance with an embodiment of the present invention.

FIG. 8 is a schematic block diagram illustrating various software layers that a proxy data access request passes through in accordance with an embodiment of the present invention. A client sends a proxy request to the local node, where it is received at an appropriate proxy port of the local HBA 805. As noted above, the proxy port may be either a virtual or physical port associated with the HBA. It should be noted that in alternate embodiments, other network interfaces may be utilized in accordance with the teachings of the present invention. The proxy request is then processed by the local FC driver 810.

Specifically, the local FC driver 810 strips FC header or footer information from the received proxy request and passes "payload" SCSI command to the local virtual SCSI target module 815. In the illustrative embodiment, this forwarding decision as to whether the payload command is forwarded to the virtual SCSI target module 815 or to the non-virtual SCSI target module (334 of FIG. 3) is made based on the port at which the command is received. For example, commands received at the proxy port are passed to the virtual SCSI target module and those commands received at the local port are passed to the local SCSI target module. It should be noted that in alternate embodiments, this forwarding decision may be based on other criteria, including, for example, an address of the initiator originating the SCSI command.

The local virtual SCSI target module 815 determines that the command is directed to the partner storage appliance and passes the command to the local virtual adapter 820. Thus, the local virtual SCSI target module 815 performs the forwarding decision as to where the received command is to be sent. In certain clustering or proxy configurations, the local storage appliance may serve as a proxy for a plurality of partner storage appliances. In such configurations, the local virtual SCSI target module 815 makes a forwarding decision based upon the intended destination of the command and forwards the command to the appropriate local virtual adapter 820.

The local virtual adapter 820 acts as an adapter for a "virtual" SCSI device, and, as such, passes the command to the local interconnect (IC) bulk layer 825, which provides appropriate flow control functionality when passing the command over the local VI emulation 830. The local VI emulation layer 830 interfaces with the local interconnect driver 835 to send an appropriate RDMA write/read operation over the physical cluster interconnect 840.

The data request is then received by the partner interconnect driver 845 and passed via the partner VI emulation and IC bulk layers 850 and 855 to a partner virtual is adapter 860. The partner virtual adapter 860 passes the received command to the partner SCSI target module 865, which then interfaces with the partner virtualization system 870. The partner virtualization system implements as the appropriate vdisk or file system primitives to perform the requested command. The responsive data is then passed from the partner virtualization system 870 to the partner SCSI target module 865, which then passes the response data through the interconnect communication stack comprising the partner virtual adapter 860, partner IC bulk 855 and partner VI emulation layers 850 to the partner IC driver 845. The partner interconnect driver 845 then transmits the response over the physical interconnect 840 to the local interconnect driver 835. Once the local interconnect driver 835 has received the response data, it is passed through the various software layers to the local virtual SCSI target module 815, which generates an appropriate SCSI response and data structure. The generated SCSI response is then passed to the local FC driver 810 to be sent out via the local HBA 805 to the requesting client.

To again summarize, the present invention is directed to a system and method for proxying data access commands between storage systems over a cluster interconnect in a storage system cluster. Commands received by a local storage system at a proxy port are conveyed over the cluster interconnect to the partner storage system to be processed and the appropriate data written or retrieved. By utilizing multi-pathing software, clients of the storage system cluster are able to utilize redundant data path to storage, namely directly to the partner storage system and also via the proxy port of the local storage system proxied to the partner storage system. Upon receipt of a command at the proxy port, the local storage system processes the command through the network stack to a virtual SCSI target module. The virtual SCSI target module forwards the command via a cluster interconnect communication stack to the cluster interconnect driver which forwards the command over the cluster interconnect to the partner storage system. At the partner storage system, the command is received by the cluster interconnect driver and passed to the cluster interconnect communication stack to the virtual SCSI target module. From the partner storage system's virtual SCSI target module, the command is passed to the virtualization system and file system for execution. Returning data is then passed through the partner storage system's cluster interconnect communication stack over the cluster interconnect to the local storage system's cluster interconnect driver. The local storage systems cluster interconnect driver passes the received data back to the virtual SCSI target module, where an appropriate response to the client is generated and forwarded back via the network protocol stack of the storage operating system.

In one embodiment, data access requests transferred over the cluster interconnect are limited to an arbitrarily chosen size, e.g., 64 KB in size. Thus, to accommodate write operations that are larger in size, multiple transfers over the cluster interconnect may be required. In such transfers, the data is sent sequentially, i.e., the first 64 KB, the second 64 KB, etc.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for proxying data access commands from a first storage system to a second storage system in a storage system cluster, comprising:
   in response to a failure in communication between a client and the second storage system, receiving, at a proxy port on the first storage system, a data access command at the first storage system that is directed to the second storage system;
   forwarding the received data access command to the second storage system via a cluster interconnect;
   processing the data access command at the second storage system;
   returning a response from the second storage system to the first storage system via the cluster interconnect; and
   sending a response to the data access command to the client from the first storage system.

2. The method of claim 1 wherein the storage systems are storage appliances.

3. The method of claim 1 wherein the proxy port comprises a physical port.

4. The method of claim 1 wherein the proxy port comprises a virtual port associated with a physical port.

5. The method of claim 1 wherein the response comprises requested read data.

6. The method of claim 1 wherein the response comprises an acknowledgement of a write operation.

7. The method of claim 1 wherein the response comprises a predetermined set of read data.

8. The method of claim 1 wherein the cluster interconnect comprises a direct link between the first storage system and the second storage system.

9. A method for proxying data access commands in a first storage system to a second system in a storage system cluster, comprising the:
   in response to a failure in communication between a client and the second storage system, receiving, at a proxy port on the first storage system, a data access command at the first storage system that is directed to the second storage system;
   analyzing a received data access command at the first storage system;
   forwarding the received data access command to the second storage system; and
   processing the received data access command at the second storage system.

10. The method of claim 9 further comprising;
    returning a response from the second storage system to the first storage system; and
    sending a response to the data access command to the client from the first storage system.

11. The method of claim 10 wherein the response comprises requested read data.

12. The method of claim 10 wherein the response comprises an acknowledgement of the write operation.

13. The method of claim 9 wherein the step of forwarding further comprises forwarding the data access command to the second storage system via a cluster interconnect.

14. The method of claim 13 wherein the cluster interconnect comprises a fibre channel link.

15. The method of claim 13 wherein the cluster interconnect comprises a direct link between the first storage system and the second storage system.

16. The method of claim 9 wherein the proxy port comprises a physical port.

17. The method of claim 9 wherein the proxy port comprises a virtual port associated with the physical port.

18. A computer readable storage device having stored thereon program instructions for executing on a computer, for proxying data access commands from a first storage system to a second storage system in a storage system cluster, wherein the program instructions when executed by the computer perform the steps of:
    in response to a failure in communication between a client and the second storage system, receiving, at a proxy port on the first storage system, a data access command at the first storage system that is directed to the second storage system;
    forwarding the received data access command to the second storage system via a cluster interconnect;
    processing the data access command at the second storage system;
    returning a response from the second storage system to the first storage system via the cluster interconnect; and
    sending a response to the data access command to the client from the first storage system.

19. A system for proxying data access commands from a first storage system to a second storage system connected via a cluster interconnect, the system comprising:
    in response to a failure in communication between a client and the second storage system, a proxy port configured to receive a data access command at the first storage system that is directed to the second storage system;
    means for forwarding the received data access command to the second storage system via a cluster interconnect;
    means for processing the data access command at the second storage system;
    means for returning a response from the second storage system to the first storage system via the cluster interconnect; and
    means for sending a response to the data access command to the client from the first storage system.

20. The system of claim 19 wherein storage systems are storage appliances.

21. The system of claim 19 wherein the proxy port comprises a physical port.

22. The system of claim 19 wherein the proxy port comprises a virtual port associated with a physical port.

23. The system of claim 19 wherein the response comprises requested read data.

24. The system of claim 19 wherein the response comprises an acknowledgement of a write operation.

25. The system of claim 19 wherein the response comprises a predetermined set of read data.

26. A method for proxying data access commands from a first storage system to a second storage system in a storage system cluster, the method comprising:
    in response to a failure in communication between a client and the second storage system, receiving, at a proxy port on the first storage system, a data access command at the first storage system that is directed to the second storage system;

forwarding a data access command from the first storage system to the second storage system;

processing the data access command at the second storage system; and returning a response from the second storage system to the first storage system.

27. The method of claim 26 further comprises sending a response to the data access command from the first storage system.

28. The method of claim 26 wherein the data access command is forwarded via a cluster interconnect.

29. The method of claim 26 further comprises returning the response from the first storage system to the client.

30. The method of claim 29 wherein the response is returned via the cluster interconnect.

31. A method for proxying data access commands from a first storage system to a second storage system in a storage system cluster, comprising:

receiving a data access command at the first storage system;

determining the data access command was received at a proxy port on the first storage system;

passing the data access command to a local virtual adapter;

forwarding the received data access command to the second storage system via a cluster interconnect;

processing the data access command at the second storage system;

returning a response from the second storage system to the first storage system via the cluster interconnect; and sending a response to the data access command to a client from the first storage system.

32. The method of claim 31, wherein the data access command is directed to the second storage system.

33. The method of claim 31, wherein the proxy port comprises a physical port.

34. The method of claim 31, wherein the proxy port comprises a virtual port.

35. The method of claim 31, wherein the first storage system receives the data access command in response to a communication failure between the client and the second storage system.

36. A system for proxying data access commands from a first storage system to a second storage system in a storage system cluster, comprising:

a proxy port on the first storage system, the proxy port to receive a data access command that is directed to the second storage system in response to a failure in communication between a client and the second storage system;

a local virtual adapter on the first storage system, the local virtual adapter to forward the received data access command to the second storage system via a cluster interconnect;

a processor on the second storage system, the processor configured to process the data access command at the second storage system;

a partner virtual adapter on the second storage system, the partner virtual adapter to return a response from the second storage system to the first storage system via the cluster interconnect; and a network adapter to send a response to the data access command to a client from the first storage system.

37. The system of claim 36, wherein the first storage system further comprises a local virtual target module to determine the data access command was received at a proxy port on the first storage system, and the local virtual target module to pass the data access command to the local virtual adapter.

38. The system of claim 36, wherein the proxy port comprises a physical port.

39. The system of claim 36, wherein the proxy port comprises a virtual port.

* * * * *